US010975955B2

(12) United States Patent
Devreese

(10) Patent No.: US 10,975,955 B2
(45) Date of Patent: Apr. 13, 2021

(54) PLANETARY GEAR SYSTEM

(71) Applicant: Dana Automotive Systems Group, LLC, Maumee, OH (US)

(72) Inventor: Thibault G. Devreese, Bruges (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/111,851

(22) Filed: Aug. 24, 2018

(65) Prior Publication Data
US 2020/0063855 A1 Feb. 27, 2020

(51) Int. Cl.
*F16H 57/04* (2010.01)
*F16H 1/28* (2006.01)
*F16H 57/08* (2006.01)

(52) U.S. Cl.
CPC .......... *F16H 57/0479* (2013.01); *F16H 1/28* (2013.01); *F16H 57/043* (2013.01); *F16H 57/0427* (2013.01); *F16H 57/0428* (2013.01); *F16H 57/0457* (2013.01); *F16H 57/0486* (2013.01); *F16H 57/082* (2013.01)

(58) Field of Classification Search
CPC .... F16H 1/28; F16H 57/0479; F16H 57/0427; F16H 57/043; F16H 57/0457; F16H 57/0486; F16H 57/082
See application file for complete search history.

(56) References Cited

U.S. PATENT DOCUMENTS

| | | |
|---|---|---|
| 5,368,528 A | 11/1994 | Farrell |
| 5,643,126 A * | 7/1997 | Hotta ................. F16H 57/0479 184/6.12 |
| 5,702,320 A * | 12/1997 | Brassai ............... F16H 57/0427 475/159 |
| 7,608,005 B2 | 10/2009 | Metten et al. |
| 7,909,140 B2 | 3/2011 | Sugihara et al. |
| 7,967,713 B2 | 6/2011 | Haupt et al. |

(Continued)

FOREIGN PATENT DOCUMENTS

JP  6086702 B  1/2017

OTHER PUBLICATIONS

Total Gold Magic, ZF Gear of the Future, Thailand Cheer Thailand, Jul. 30, 2013, 22 pages, Retrieved from http://thairath.co.th/content/439918.

(Continued)

*Primary Examiner* — Timothy Hannon
(74) *Attorney, Agent, or Firm* — McCoy Russell LLP

(57) ABSTRACT

A planetary gear system including a first gear coupled to a shaft, a plurality of second gears in rotational engagement with the first gear, a fluid supply apparatus spaced apart from the second gears, and a carrier. The carrier includes an annular portion having a flow channel configured to receive a fluid deposited onto the carrier by the fluid supply apparatus. A pinion shaft is disposed through each of the second gears and includes a primary fluid conduit in fluid communication with the flow channel and at least one secondary fluid conduit in fluid communication with the primary fluid conduit. The primary fluid conduit and the at least one secondary fluid conduit facilitate a flow of the fluid from the flow channel to at least one bearing disposed on each of the pinion shafts and at least one thrust plate interposed between the second gears and the carrier.

20 Claims, 2 Drawing Sheets

(56) References Cited

U.S. PATENT DOCUMENTS

| | | | |
|---|---|---|---|
| 8,911,318 B2 | 12/2014 | Iizuka | |
| 9,447,863 B2* | 9/2016 | Tonokura | F16H 57/0479 |
| 9,933,066 B2* | 4/2018 | Sada | F16H 57/0447 |
| 2009/0247348 A1* | 10/2009 | Haupt | F16H 57/0427 |
| | | | 475/159 |
| 2011/0230292 A1* | 9/2011 | Komatsu | B60K 6/365 |
| | | | 475/5 |
| 2012/0157256 A1* | 6/2012 | Takeuchi | F03D 15/10 |
| | | | 475/159 |
| 2012/0252627 A1* | 10/2012 | Koyama | F16H 57/082 |
| | | | 475/331 |
| 2013/0283972 A1* | 10/2013 | Yamamoto | F16H 57/0486 |
| | | | 74/665 B |
| 2020/0010072 A1* | 1/2020 | Iwakura | F16H 57/0436 |

OTHER PUBLICATIONS

Dr. Rolf Langbein, Transmissions also have a future in the electric vehicle, AutomobilKONSTRUKTION, May 24, 2013, 9 pages, Retrieved from https://automobilkonstruktion.industrie.de/alternative-antriebe/getriebe-haben-auch-im-e-fahrzeug-eine-zukenft/.

* cited by examiner

PLANETARY GEAR SYSTEM

FIELD

The subject matter of the embodiments described herein relates generally to a planetary gear system and, more particularly, to a planetary gear system configured to enhance lubrication and militate against friction and excessive wear thereto.

BACKGROUND

Planetary gear systems typically include a central sun gear, a plurality of planet gears circumferentially spaced around the sun gear and mounted on a planet carrier, and an external ring gear. An input to the planetary gear system can be to one of the sun gear, the ring gear, or the planet carrier, while an output is derived from either of the remaining sun gear, the ring gear, or the planet carrier which is not the input.

Lubrication of the planetary gear system is essential due to a high-speed rotation of the sun gear and rotational engagement amongst the sun gear, the planetary gears, and the ring gear. As such, inadequate lubrication of the planetary gear system causes increased friction between the gears and excessive wear, necessitating frequent inspection thereof. The planetary gear system, however, is often disposed in a compact arrangement making it difficult to inspect without at least partial disassembly thereof.

In certain applications, the planetary gear system is mounted within a housing at least partially filled with a fluid (e.g. a lubricant) to act as a fluid sump. The fluid is provided to the planetary gear system by a separate lubrication system. The lubrication system is an additional component with resulting complications. Further, the lubrication system in a conventional planetary gear system may not cause the fluid to reach friction bearing components of the planetary gear system such as needle bearings and thrust plates, for example.

It would desirable to produce a planetary gear system configured to enhance lubrication as well as militate against friction and excessive wear thereto.

SUMMARY

In concordance and agreement with the present disclosure, a planetary gear system configured to enhance lubrication as well as militate against friction and excessive wear thereto, has surprisingly been discovered.

In one embodiment, a planetary gear system, comprises: a carrier including an annular portion formed on an outer face thereof, wherein the annular portion has a flow channel configured to receive a fluid formed therein, and wherein at least a portion of the fluid is deposited onto the outer face of the carrier by at least one fluid supply apparatus disposed adjacent the carrier; and at least one pinion shaft at least partially support by the carrier, wherein the at least one pinion shaft includes a primary fluid conduit in fluid communication with the flow channel of the annular portion and at least one secondary fluid conduit in fluid communication with the primary fluid conduit formed therein, wherein the primary fluid conduit and the at least one secondary fluid conduit are configured to facilitate a flow of the fluid from the flow channel of the carrier to at least one bearing disposed on an outer peripheral surface of the at least one pinion shaft.

In another embodiment, a planetary gear system, comprises: a first gear coupled to a shaft; at least one second gear in rotational engagement with said first gear; at least one fluid supply apparatus laterally spaced apart from said at least one second gear; a carrier at least partially disposed between said at least one second gear and said at least one fluid supply apparatus, wherein said carrier includes an annular portion having a flow channel configured to receive a fluid formed thereon, and wherein at least a portion of the fluid is deposited onto said carrier by said at least one fluid supply apparatus; and at least one pinion shaft disposed through said at least one second gear, wherein said at least one pinion shaft includes a primary fluid conduit in fluid communication with the flow channel of the annular portion and at least one secondary fluid conduit in fluid communication with the primary fluid conduit formed therein, wherein the primary fluid conduit and the at least one secondary fluid conduit are configured to facilitate a flow of the fluid from the flow channel of said carrier to at least one bearing disposed on an outer peripheral surface of said at least one pinion shaft.

As aspects of certain embodiments, the outer face of the carrier further includes a hub formed thereon.

As aspects of certain embodiments, the annular portion of the carrier is spaced radially outwardly from the hub.

As aspects of certain embodiments, the carrier includes a first end plate, a second end plate spaced apart from the first end plate, and a web formed therebetween.

As aspects of certain embodiments, the annular portion of the carrier is formed entirely outside the primary fluid conduit of the at least one pinion shaft.

As aspects of certain embodiments, the primary fluid conduit is formed in the at least one pinion shaft so as to extend in an axial direction along an X-axis.

As aspects of certain embodiments, the X-axis is substantially parallel to a central axis of the planetary gear system.

As aspects of certain embodiments, the primary fluid conduit is formed in the at least one pinion shaft from an opening formed in an end thereof to an intermediate portion thereof.

As aspects of certain embodiments, the at least one secondary fluid conduit is formed in the at least one pinion shaft so as to extend outwardly in a radial direction from the primary fluid conduit.

As aspects of certain embodiments, the at least one secondary fluid conduit is radially aligned with at least one other secondary fluid conduit to form a fluid passage extending entirely through the at least one pinion shaft substantially perpendicular to the primary fluid conduit.

As aspects of certain embodiments, at least one thrust plate is interposed between said at least one second gear and at least a portion of said carrier.

As aspects of certain embodiments, the at least one thrust plate is a generally circular-shaped disc having an axial cylindrical bore formed therethrough.

As aspects of certain embodiments, the at least one fluid supply apparatus is a third gear.

As aspects of certain embodiments, the primary fluid conduit and the at least one secondary fluid conduit are configured to facilitate a flow of the fluid from the flow channel of the annular portion of said carrier to the at least one thrust plate.

BRIEF DESCRIPTION OF THE DRAWINGS

The above, as well as other objects and advantages of the subject matter of the embodiments described herein, will become readily apparent to those skilled in the art from a reading of the following detailed description of the embodiments when considered in the light of the accompanying drawings in which.

DETAILED DESCRIPTION

The following detailed description and appended drawings describe and illustrate various exemplary embodiments. The description and drawings serve to enable one skilled in the art to make and use the embodiments, and are not intended to limit the scope of the embodiments in any manner.

Figure 1:
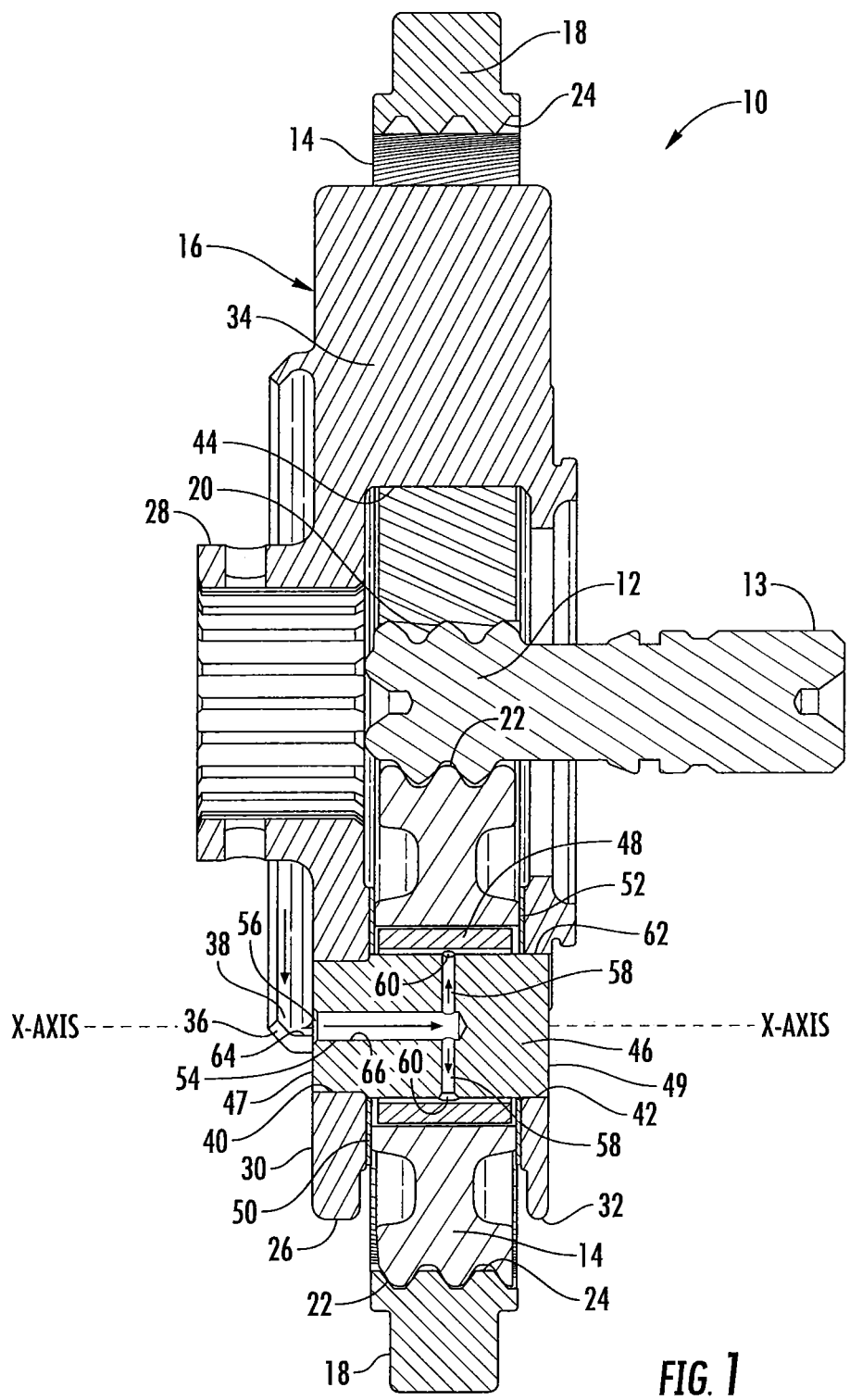
FIG. 1 is a cross-sectional view of a planetary gear system including a sun gear, a plurality of planet gears, a planet carrier, and a ring gear according to an embodiment.
Figure 2:
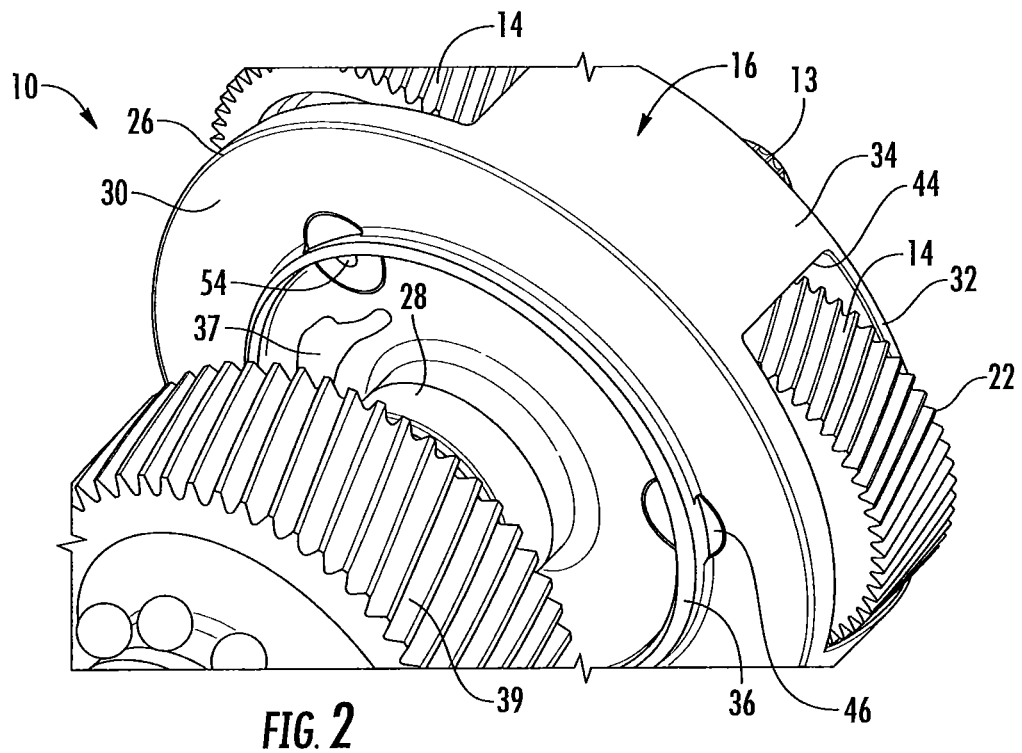
FIG. 2 is a fragmentary top perspective view of the planetary gear system shown in FIG. 1, wherein the ring gear has been removed and a fluid supply apparatus (e.g. a helical gear) is included.
Figure 3:
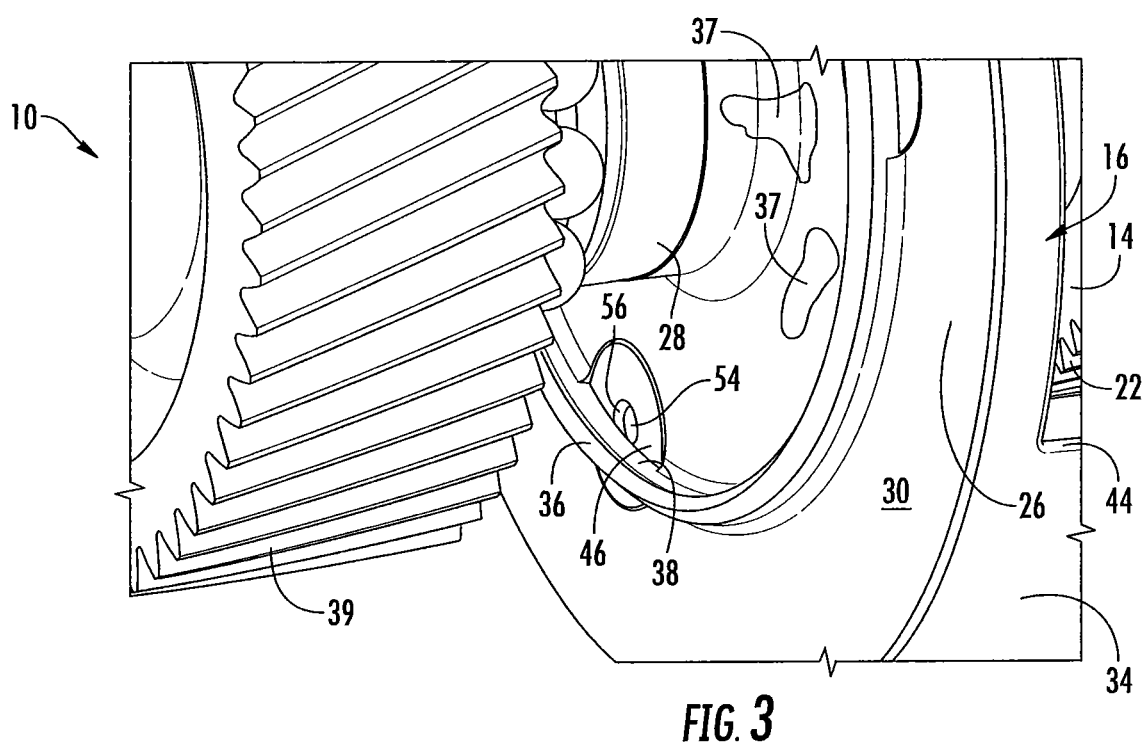
FIG. 3 is an enlarged fragmentary bottom perspective view of the planetary gear system shown in FIGS. 1 and 2, wherein the ring gear has been removed and the fluid supply apparatus is included.

FIGS. 1-3 depict at least a portion of a planetary gear system 10 according to one embodiment. The planetary gear system 10 includes a first or sun gear 12 rotatably coupled to a drive shaft 13, a plurality of second or planet gears 14 mounted on a carrier 16, a fluid supply apparatus 39 laterally spaced apart from the planet gears 14, and a ring gear 18 disposed within a housing (not shown). The fluid supply apparatus 39 is configured to provide a fluid 37 (shown in FIGS. 2-3) to the planetary gear system 10 from a fluid reservoir (not shown). It is understood that the fluid 37 can be any fluid as desired such as a lubricant, for example. It should be appreciated that the fluid reservoir may be a housing having the planetary gear system 10 disposed therein, which is at least partially filled with the fluid to act as a fluid sump. In certain embodiments, the fluid supply apparatus 39 may be a movable member (e.g. a third or helical gear) at least partially disposed in the fluid reservoir, a fluid pump in fluid communication with the fluid reservoir, and the like. In certain embodiments, the fluid supply apparatus 39 is configured to receive the fluid 37 from the fluid reservoir either by a portion of the fluid supply apparatus 39 moving through the fluid 37 or a fluid conduit (not shown).

In the embodiment shown, the planetary gear system 10 includes three equally circumferentially spaced planet gears 14 mounted on the carrier 16. It is understood, however, that the planetary gear system 10 can include any number and size of planet gears 14 as desired. One of ordinary skill in the art should further understand that the planet gears 14 may be mounted at various other positions on the carrier 16. As illustrated, each of the planet gears 14 is in rotational engagement with the sun gear 12 and the ring gear 18. In certain embodiments, the sun gear 12 and each of the planet gears 14 includes a plurality of respective engaging elements 20, 22 formed on an outer periphery thereof, and the ring gear 18 includes a plurality of engaging elements 24 formed on an inner periphery thereof. The engaging elements 22 of the planet gears 14 mesh with both the engaging elements 20 of the sun gear 12 and the engaging elements 24 of the ring gear 18. Various other methods of rotational engagement between each of the planet gears 14, the sun gear 12, and the ring gear 18 can be employed, if desired.

In certain embodiments, the carrier 16 includes a first end plate 26 having a splined hub 28 formed on an outer face 30 thereof, a second end plate 32 spaced apart from the first end plate 26, and a web 34 formed therebetween. The outer face 30 of the first end plate 26 also includes an outwardly extending annular portion 36 integrally formed thereon. In other embodiments, the annular portion 36 can be coupled to the first end plate 26 as a separate and distinct component of the carrier 16. The annular portion 36 forms an annular flow channel 38 for the fluid 37. In particular embodiments, the annular portion 36 is spaced radially outwardly from the hub 28 to collect the fluid 37 deposited on the outer face 30 of the first end plate 26 by the fluid supply apparatus 39. As shown in FIGS. 2 and 3, the fluid supply apparatus 39 may be disposed axially adjacent to the carrier 16. A centrifugal force causes the fluid 37 deposited onto the carrier 16 by the fluid supply apparatus 39 to flow radially outwardly across the outer face 30 of the first end plate 26 and into the flow channel 38.

As illustrated in FIG. 1, each of the end plates 26, 32 includes a plurality of apertures 40, 42, respectively, formed therein. The apertures 40 formed in the first end plate 26 are aligned with the apertures 42 formed in the second end plate 32. Additionally, the web 34 is formed with recesses 44 at angularly spaced locations aligned with the apertures 40, 42, thereby allowing at least a portion of the planet gears 14 to protrude therefrom. In the embodiment shown, the end plates 26, 32 each include three equally circumferentially spaced apertures 40, 42, respectively, formed therein. Similarly, the web 34 includes three angularly spaced recesses 44 aligned with the apertures 40, 42. It is understood, however, that the end plates 26, 32 can include any number and size of apertures 40, 42 and the web 34 can include any number and size of recesses 44, as desired. One of ordinary skill in the art should further understand that the apertures 40, 42 may be formed at various other positions in the respective end plates 26, 32, and the recesses 44 may be formed at various other positions in the web 34.

The planetary gear system 10 shown further includes a plurality of pinion shafts 46. Each of the pinion shafts 46 is disposed axially through one of the planet gears 14 and supported at respective ends 47, 49 thereof by a pair of the apertures 40, 42 formed in the respective end plates 26, 32 of the carrier 16. The pinion shafts 46 may be coupled to the carrier 16 by any device or method as desired such as being press fit into the apertures 40, 42 or secured by a pin, for example. A needle bearing 48, shown in FIG. 1, is radially disposed on an outer periphery of each of the pinion shafts 46. Each of the planet gears 14 is rotatably supported on the outer periphery of each of the pinion shafts 46 by the needle bearing 48. In certain embodiments, each of the pinion shafts 46 has a generally cylindrical shape. It is understood, however, that the pinion shafts 46 can have other shapes and sizes as desired.

In certain embodiments, the planetary gear system 10 further includes a first thrust plate 50 and a second thrust plate 52. The thrust plates 50, 52 are configured to minimize friction and excessive wear between the planet gears 14 and the carrier 16. In the certain embodiments, each of the thrust plates 50, 52 is a generally circular-shaped disc having an axial cylindrical bore formed therethrough. It is understood that each of the thrust plates 50, 52 can have various shapes and sizes as desired. As illustrated in FIG. 1, the first thrust plate 50 is disposed about each of the pinion shafts 46 and interposed between the first end plate 26 of the carrier 16 and at least one of the planet gears 14. Similarly, the second thrust plate 52 is disposed about each of the pinion shafts 46 and interposed between the second end plate 32 of the carrier 16 and at least one of the planet gears 14. As shown, each of the planet gears 14, the carrier 16, and the thrust plates 50, 52 may have at least one substantially planar face. It is understood, however, that each of the planet gears 14, the carrier, 16, and the thrust plates 50, 52 may have at least one face including various patterns and configurations of channels formed therein and protuberances formed thereon.

A primary fluid conduit 54 is formed in each of the pinion shafts 46 so as to extend in an axial direction along an X-axis from an opening 56 to an intermediate portion of the pinion shaft 46. As illustrated in FIG. 1, the X-axis is substantially parallel to a central axis of the planetary gear system 10. A plurality of secondary fluid conduits 58, shown in FIG. 1, is also formed in each of the pinion shafts 46 so as to extend outwardly in a radial direction from the primary fluid conduit 54 to openings 60 formed in an outer peripheral surface 62 of the pinion shafts 46. In certain embodiments, the secondary fluid conduits 58 are radially aligned to form a fluid passage extending entirely through the pinion shafts 46 substantially perpendicular to the primary fluid conduit 54.

The primary fluid conduit 54 is in fluid communication with the flow channel 38 and the secondary fluid conduits 58. In certain embodiments, the primary fluid conduit 54 is in fluid communication with the flow channel 38 and the second flow conduits 58 to facilitate a flow of the fluid 37 from the flow channel 38, through the primary fluid conduit 54 and the secondary fluid conduits 58, through the openings 60, and onto the needle bearings 48 and thrust plates 50, 52 to minimize friction and excessive wear thereof. As illustrated, the annular portion 36 is formed on the outer face 30 of the first end plate 26 so that an inner peripheral surface 64 of the flow channel 38 is substantially continuous with an inner peripheral surface 66 of the primary fluid conduit 54 to enhance the flow of the fluid 37 from the flow channel 38 to the primary fluid conduit 54.

In operation, the fluid supply apparatus 39 receives the fluid 37 from the fluid reservoir. Thereafter, the fluid supply apparatus 39 deposits the fluid 37 onto the outer surface 30 of the first end plate 26 of the carrier 16. The centrifugal force of the carrier 16 causes the fluid 37 deposited by the fluid supply apparatus 39 to flow radially outwardly across the outer surface 30 of the carrier 16 into the flow channel 38 of the annular portion 36 formed thereon. The fluid 37 then flows from the flow channel 38 through the openings 56 of the primary fluid conduits 54 formed in each of the pinion shafts 46. Thereafter, the centrifugal force causes the fluid 37 to flow through the primary fluid conduits 54, through the secondary fluid conduits 58, through the openings 60 formed in the each of the pinion shafts 46, and onto the needle bearings 48 and thrust plates 50, 52 to provide adequate lubrication thereto.

From the foregoing description, one ordinarily skilled in the art can easily ascertain the essential characteristics of the subject matter of the embodiments described herein and, without departing from the spirit and scope thereof, can make various changes and modifications to the embodiments to adapt them to various usages and conditions.

What is claimed is:

1. A planetary gear system, comprising:
   a carrier including an integrally formed annular portion comprised of a wall extending perpendicular to an outer face of the carrier and extending in a circumference around the outer surface;
   wherein the annular portion has a flow channel formed on an interior side of the wall of the annular portion configured to receive a fluid; and
   wherein at least a portion of the fluid is deposited onto the outer face of said carrier within the wall of the annular portion by at least one fluid supply apparatus comprised of a third gear disposed axially adjacent to said carrier and the fluid flows radially outward on the outer face of the carrier to the flow channel; and
   at least one pinion shaft at least partially support by said carrier;
   wherein said at least one pinion shaft includes the primary fluid conduit in fluid communication with the flow channel of the annular portion and at least one secondary fluid conduit in fluid communication with the primary fluid conduit formed therein;
   wherein the primary fluid conduit and the at least one secondary fluid conduit are configured to facilitate a flow of the fluid from the flow channel of said carrier to at least one bearing disposed on an outer peripheral surface of said at least one pinion shaft; and
   wherein the carrier includes a first axial side having a sun gear axially extending therefrom and a second axial side opposing the first axial side and including the flow channel.

2. The planetary gear system according to claim 1, wherein the outer face of said carrier further includes a hub formed thereon, and the hub positioned between the outer face of the carrier and the third gear.

3. The planetary gear system according to claim 2, wherein the annular portion of said carrier is spaced radially outward from the hub.

4. The planetary gear system according to claim 1, wherein said carrier includes a first end plate, a second end plate spaced apart from the first end plate, and a web formed therebetween.

5. The planetary gear system according to claim 1, wherein the wall of the annular portion of said carrier is formed entirely radially outside of the primary fluid conduit on the outer face of the carrier.

6. The planetary gear system according to claim 1, wherein the primary fluid conduit terminates at a junction with the at least one secondary fluid conduit.

7. The planetary gear system according to claim 1, wherein the primary fluid conduit is formed in said at least one pinion shaft from an opening formed in an end thereof to an intermediate portion thereof.

8. The planetary gear system according to claim 1, wherein the at least one secondary fluid conduit is formed in said at least one pinion shaft so as to extend outwardly in a radial direction from the primary fluid conduit.

9. The planetary gear system according to claim 1, wherein the at least one secondary fluid conduit is radially aligned with at least one other secondary fluid conduit to form a fluid passage extending through said at least one pinion shaft substantially perpendicular to the primary fluid conduit.

10. The planetary gear system according to claim 1, wherein the third gear is a helical gear, and an end face of the helical gear is parallel with the outside face of the carrier, and
   the helical gear is positioned on a distal side of a hub and the distal side of the hub is opposite the outside face of the carrier.

11. A planetary gear system, comprising:
   a first gear coupled to a shaft;

at least one second gear in rotational engagement with said first gear;

at least one fluid supply apparatus laterally spaced apart from said at least one second gear and configured to deliver fluid to an outer face of a carrier;

the carrier at least partially disposed between said at least one second gear and said at least one fluid supply apparatus, wherein said carrier includes an integrally formed annular portion formed as a wall extending perpendicular to the outer face of the carrier and extending in a circumference around the outer surface, the wall of the annular portion having a flow channel formed on an interior side of the wall configured to receive a fluid formed thereon, and wherein at least a portion of the fluid is deposited onto said carrier by said at least one fluid supply apparatus within the wall of the annular portion, and the fluid flows radially outward on the outer face of the carrier to the flow channel; and at least one pinion shaft disposed through said at least one second gear, wherein said at least one pinion shaft includes a primary fluid conduit in fluid communication with the flow channel of the annular portion and at least one secondary fluid conduit in fluid communication with the primary fluid conduit formed therein, wherein the primary fluid conduit and the at least one secondary fluid conduit are configured to facilitate a flow of the fluid from the flow channel of said carrier to at least one bearing disposed on an outer peripheral surface of said at least one pinion shaft, wherein said at least one fluid supply apparatus is a third gear positioned axially adjacent to the carrier on a side of the carrier including the annular portion.

12. The planetary gear system according to claim 11, wherein the primary fluid conduit and the at least one secondary fluid conduit are configured to facilitate a flow of the fluid from the flow channel of the annular portion of said carrier to at least one thrust plate.

13. The planetary gear system according to claim 11, wherein the at least one thrust plate is a generally circular-shaped disc having an axial cylindrical bore formed therethrough.

14. The planetary gear system according to claim 11, further comprising a hub coupled to the outer face of the carrier adjacent to the flow channel, and the hub positioned between the outer face of the carrier and the third gear.

15. The planetary gear system according to claim 14, wherein the annular portion extends across and bisects an outer face of the at least one pinion shaft.

16. The planetary gear system according to claim 14, wherein the carrier includes a first end plate, a second end plate spaced apart from the first end plate, and a web formed therebetween.

17. The planetary gear system according to claim 14, wherein the wall of the annular portion of the carrier is formed entirely radially outside of the primary fluid conduit on the outside face of the carrier.

18. The planetary gear system according to claim 14, wherein the primary fluid conduit is formed in the at least one pinion shaft so as to extend in an axial direction.

19. The planetary gear system of claim 11, wherein the primary fluid conduit terminates at a junction with the at least one secondary fluid conduit.

20. The planetary gear system of claim 11, wherein the third gear is a helical gear, and an end face of the helical gear is parallel with the outside face of the carrier, and the helical gear has a helix angle relative to an end face of the helical gear.

* * * * *